United States Patent [19]
Moran

[11] Patent Number: 5,665,903
[45] Date of Patent: Sep. 9, 1997

[54] TECHNIQUE FOR TESTING PIPE COUPLINGS FOR DEFECTS

[76] Inventor: William John Moran, 119 Brook St., Carbondale, Pa. 18407

[21] Appl. No.: 734,099

[22] Filed: Oct. 21, 1996

[51] Int. Cl.⁶ .................. G01M 3/28; G01M 3/04
[52] U.S. Cl. .................. 73/49.5; 73/46; 73/40.7; 73/49.1
[58] Field of Search .................. 73/49.5, 49.1, 73/46, 40.7, 49

[56] References Cited

U.S. PATENT DOCUMENTS

| | | | |
|---|---|---|---|
| 3,921,437 | 11/1975 | Hauk | 73/40.5 R |
| 4,194,389 | 3/1980 | Laging | 73/46 |
| 4,727,749 | 3/1988 | Miller et al. | 73/46 |
| 4,733,554 | 3/1988 | Lazes | 73/46 |
| 4,876,884 | 10/1989 | Jansch | 73/49.1 |
| 4,926,680 | 5/1990 | Hasha et al. | 73/46 |
| 5,209,105 | 5/1993 | Hasha et al. | 73/49.1 |
| 5,267,469 | 12/1993 | Espinoza | 73/40.5 R |
| 5,309,752 | 5/1994 | Beckinghausen et al. | 73/40.7 |
| 5,330,720 | 7/1994 | Sorbo et al. | 422/98 |
| 5,461,905 | 10/1995 | Penisson | 73/46 |

*Primary Examiner*—Hezron E. Williams
*Assistant Examiner*—J. David Wiggins
*Attorney, Agent, or Firm*—Douglas M. Clarkson

[57] ABSTRACT

A method and apparatus for testing a new pipe coupling for a leak that could be too small to be detected visually involves a section of pipe, a hole through the pipe, a 90 degree ell affixed to the hole from inside the section of pipe, a length of tubing from the 90 degree ell extending to a tee outside the section of pipe, an air gage attached to the tee, and a tire pump attached to the tee for applying about 100 psi of air pressure to the interior of such pipe coupling through the hole to a small space between the section of pipe and the coupling, for locating a leak in the coupling after first sealing the pipe coupling to the pipe section, as done by observation at the air gage of a decrease in air pressure at such small space.

5 Claims, 1 Drawing Sheet

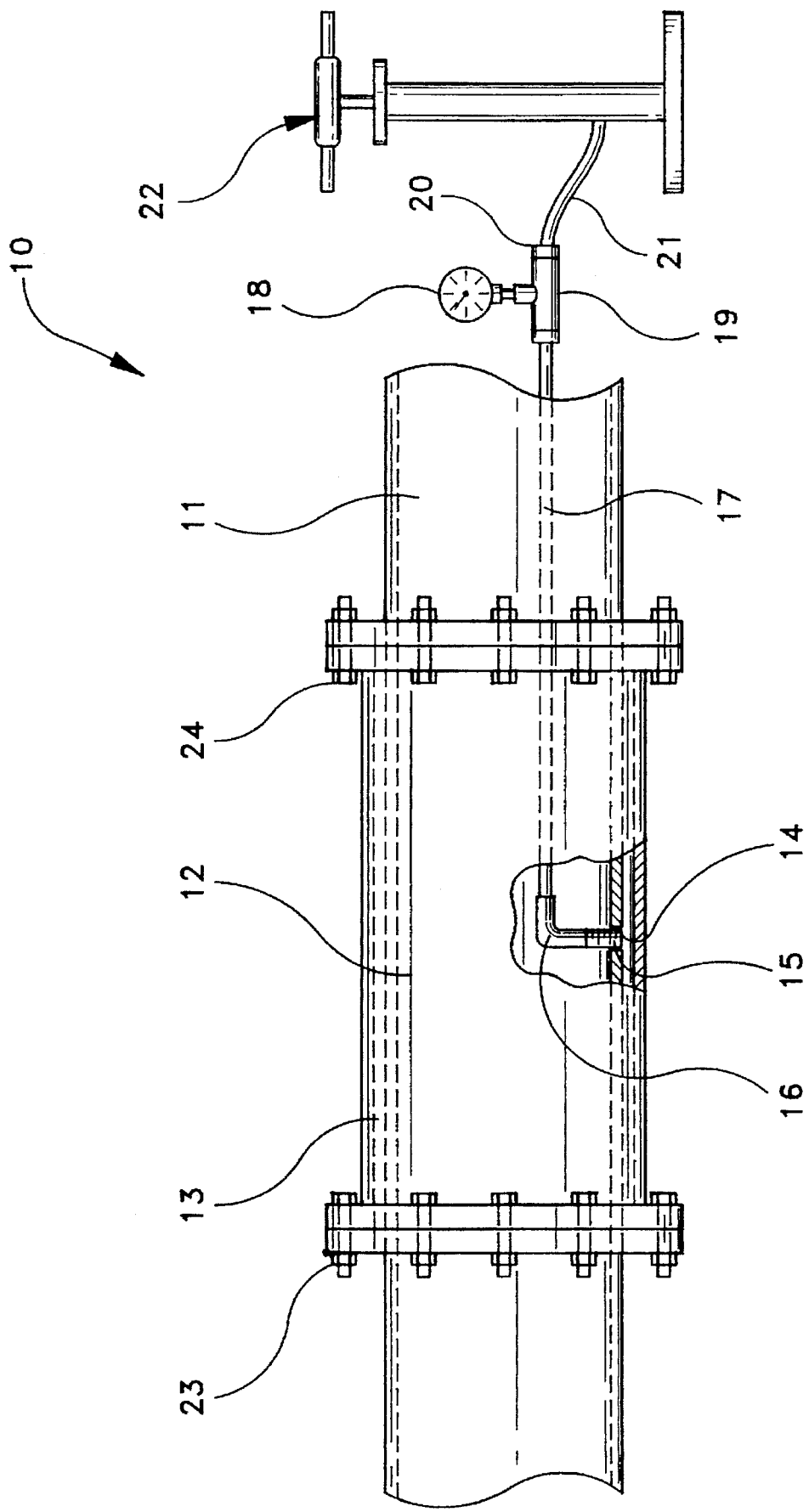

TECHNIQUE FOR TESTING PIPE COUPLINGS FOR DEFECTS

BACKGROUND OF THE INVENTION

1. Field of the Invention

The present invention, generally, relates to a technique for testing a coupling that covers a repaired pipe for a leak and, more particularly, to a technique for the testing of a new coupling that is to be used to seal a repaired or reworked section of a pipe.

When a defect is discovered in a pipe that is underground and the pipe carries sewage, for example, it is uncovered, the fault is located and is repaired, and it is customary to install a coupling to cover the repaired section. However, such couplings usually are small and, as it has been discovered, can have a small defect that can produce over time a condition that can be harmful to humans or even to the environment.

A new coupling that is scheduled for installation on a pipe carrying a deadly gas, for example, should be tested even more carefully because the smallest defect, probably not even visible to the naked eye, can leak, and it can cause, over time, a very serious condition to develop.

While testers have been suggested in the past for testing pipes that have been repaired, there remains no way to test a coupling that usually is used to cover the point of repair or to cover and seal a pipe at the point of a defect which is not fixed or repaired. The coupling is shorter than a length of pipe, but it can have a small defect produced by a number of events, such as rough or careless handling, dropping, being bumped during transit, improper manufacture or installation, etc.

The coupling being subjected to a test in accordance with the present invention can be any length, because they usually are made to cover a section of pipe that has been damaged, usually (but not necessarily) is underground, and usually (but not necessarily) has been repaired. In other words, the coupling covers a part of a pipe to effect a seal, which will not happen if the coupling itself has a defect.

A defect in a pipe coupling can be produced during the process of molding when the coupling is made. Such a defect is not detectable immediately and only is observed when a dangerous condition is created, such as when a gas escapes very slowly but builds up in a confined area, like underground.

Furthermore, the coupling being tested in accordance with the present invention usually is made to fit over a pipe that is in the order of 6 inches in diameter usually is made of a material such as ductile iron which is not threaded or welded. A reason that iron is the material of which the pipes are made is that these pipes are underground or below ground level and in an environment that is wet or entirely under water.

U.S. Pat. No. 3,779,068 to Forsythe describes applying air pressure to test a pipe joint for a leak but fails to suggest the use of a coupling to cover the joint.

U.S. Pat. No. 4,070,904 to VanderLans describes the use of spaced-apart inflatable gasket rings to seal the area around a pipe joint for introducing fluid under pressure without using a coupling for a seal.

U.S. Pat. No. 5,209,105 to Hasha et al. describes testing a connection between two pipes by applying a pressurized hydrostatic test fluid to the connection from inside.

OBJECT AND SUMMARY OF THE INVENTION

Accordingly, it is an object of the present invention to provide a technique for testing a coupling that is to cover a section of a pipe, sealing against leaks.

It is also an object of the present invention to provide a pipe coupling test method that is adaptable for use in instructing proper sealing techniques to students.

Briefly, the technique according to the present invention involves testing new couplings to be used to ensure that a section of pipe on which repairs are completed is sealed effectively. A pipe coupling to be tested is affixed to a length of pipe of the same size that the coupling is made to fit, and air is supplied from inside the pipe section to the space between the coupling and the outer surface of the pipe section. If no reduction in the pressure is observed after a period of time, the coupling is safe to use.

BRIEF DESCRIPTION OF THE DRAWING

The single figure of the drawing illustrates the arrangement of a coupling on a section of pipe as an aid in the description of the testing technique.

DETAILED DESCRIPTION OF THE INVENTION

There are two aspects of the present invention. One involves the testing of a new pipe coupling before it is installed to seal a repaired pipe or to seal a defect in a pipe, and the second involves its use as a training aid in vocational and training schools to provide students with hands on experience in proper handling and assembly of pipe couplings.

The Tester Apparatus

Referring to the single figure in the drawing, an apparatus constructed, connected and arranged according to the invention is identified generally by the reference numeral 10 and includes a section of a pipe 11 longer than a new pipe coupling 12 to be tested.

A space 13 is defined between the pipe coupling 12 and the outer surface of the pipe 11, which is quite small, approximating a total volume of about 4 cubic inches. The small space 13 permits it to be pressurized with only about 8 to 14 strokes of a hand pump, to be described in more detail hereinafter.

A small hole 14 is drilled through the pipe 11 and is tapped to receive a 2-4 inch long nipple 15 for connecting a 90 degree ell 16 on the inside of the pipe 11. It is important that the outer end of the nipple 15 not protrude outside the outer surface of the pipe 11.

While a tube 17 can be flexible, if desired, the presently preferred form of the invention contemplates that the tube 17 from the 90 degree ell 15 is best characterized as rigid, in contrast with a soft, pliable tubing, such as rubber. According to this form of the invention, the tube 17 is connected to an accurate air gage 18 and in a preferred form of the invention, the tube 17 is sufficiently rigid to support the air gage 18.

A tee fitting 19 provides a preferred connection between the end of the rigid tube 17 and the air gage 18. An adapter 20 serves to connect the tee fitting 19 to a flexible tube 21 from a suitable hand-operated tire pump 22.

The air gage 18 is connected to an inexpensive source of air pressure, such as a hand-operated tire pump. The present invention contemplates using a form of regulatable, controllable hand pump that is capable of producing air under a pressure of about 100 lbs, although the air gage 18 is capable of indicating a pressure of up to 200 lbs.

As a Training Aid

To provide hands on training for students, the method of the invention uses the apparatus described hereinabove. It would be explained that, for example, a 4 inch underground pipe carrying gas has been discovered to have developed a leak which, if not repaired quickly, could produce a dangerous condition.

The usual pipe coupling is to be installed to cover the pipe section that is defective, and it is considered wise, desirable and prudent to test the pipe coupling first.

The above described apparatus 10 will be used. The coupling 12 to be tested is slid over the pipe 11 to cover the hole 14.

The coupling is secured and sealed in place by tightening the bolts 23 and 24 at opposite ends of the coupling. By operating the hand pump 22 while observing the air gage 18, the pressure under the coupling 11 is raised to 100 lbs, which is considerably above the pressure that the coupling must seal against.

These steps not only provide experience for a student, but test the new coupling that is to be installed.

While various modifications and changes in the present invention may occur go one skilled in this art, it is understood that all such modifications and changes that come within the scope and spirit of the appended claims are within the invention.

What is claimed is:

1. An apparatus for testing a pipe coupling that is to be used for sealing a part of a pipe, comprising:

a section of pipe, with an inside surface and an outside surface, with a length longer than said pipe coupling to be tested, and having two ends;

means to define an opening in said length of pipe at a predetermined location intermediate said two ends;

said opening extending through said length of pipe from said inside surface to said outside surface;

nipple means attached to said opening from said inside surface with an outer end of said nipple means mounted within, or surface flush with, said pipe outside surface but not beyond said outside surface of said section of pipe, and extending a predetermined distance into said section of pipe to define an inner end;

a 90 degree ell having two ends, one of which is attached to said inner end of said nipple means, and the other of its two ends pointed toward one end of said section of pipe;

means for mechanically sealing said pipe coupling against said outside surface of said section of pipe;

tube means attached at one end to said other end of said 90 degree ell with a second end of said tube means defining a length extending at least out of said section of pipe;

tee means with three openings, one of its openings attached to said second end of said tube means;

air pressure gage means attached to any one of the remaining openings of said tee means;

adapter means attached to a third of said three openings of said tee means for attaching a source of air pressure.

2. An apparatus as defined by claim 1 wherein said predetermined distance said nipple means extends into said pipe to define said inner end is within the range of 2 to 4 inches.

3. An apparatus as defined by claim 1 wherein said source of air pressure is a hand operable tire pump.

4. A method for testing a pipe coupling for a leak comprising the following steps:

selecting a section of pipe longer than said pipe coupling to be tested;

drilling a hole in said section of pipe;

attaching a 90 degree ell to said hole from the inside of said section of pipe;

attaching tube means, having a length of about one-half the length of said section of pipe, to said ell;

attaching a tee means to said tube means at an end furthermost from said 90 degree ell;

attaching air pressure gage means to said tee means;

attaching a source of air pressure to said tee means;

affixing said pipe coupling to be tested to said section of pipe at a location covering said hole;

mechanically sealing said pipe coupling against the outside surface of said section of pipe;

applying air under a pressure, as indicated by said air pressure gage means, of about 100 psi through said tube means and said 90 degree ell to a space between said section of pipe and said pipe coupling; and observing any pressure decrease at said air pressure gage means to indicate the occurrence of a leak in said pipe coupling.

5. A method as defined by claim 4 wherein each of said attaching steps includes the use of a mechanical union between mated parts accomplished by threading.

* * * * *